United States Patent

[11] 3,602,042

| | | |
|---|---|---|
| [72] | Inventor | Wallace F. Mitchell<br>Arlington Heights, Ill. |
| [21] | Appl. No. | 794,058 |
| [22] | Filed | Jan. 27, 1969 |
| [45] | Patented | Aug. 31, 1971 |
| [73] | Assignee | Ammco Tools, Inc.<br>North Chicago, Ill. |

[54] BRAKE TESTER
8 Claims, 5 Drawing Figs.

[52] U.S. Cl. .................................................. 73/126,
   73/132
[51] Int. Cl. ................................................... G01l 3/14
[50] Field of Search ........................................ 73/126,
   123, 117

[56] References Cited
UNITED STATES PATENTS

| 1,879,721 | 9/1932 | Walker .......................... | 73/126 X |
| 1,987,706 | 1/1935 | Prentiss ........................ | 73/126 |

*Primary Examiner*—Jerry W. Myracle
*Attorney*—Fidler, Bradley, Patnaude & Lazo

ABSTRACT: A brake tester includes a weighing scale, wheel-engaging drive rollers for rotating the wheels at a fixed speed, idler rollers for controlling the footprint of the wheels on the drive rollers and display devices for indicating brake pedal pressure, vehicle weight on the wheels under test, and the actual braking torque of each wheel.

PATENTED AUG 31 1971 3,602,042

INVENTOR.
WALLACE F. MITCHELL

BY Fidler, Bradley & Patnaude
ATTYS

INVENTOR.
WALLACE F. MITCHELL

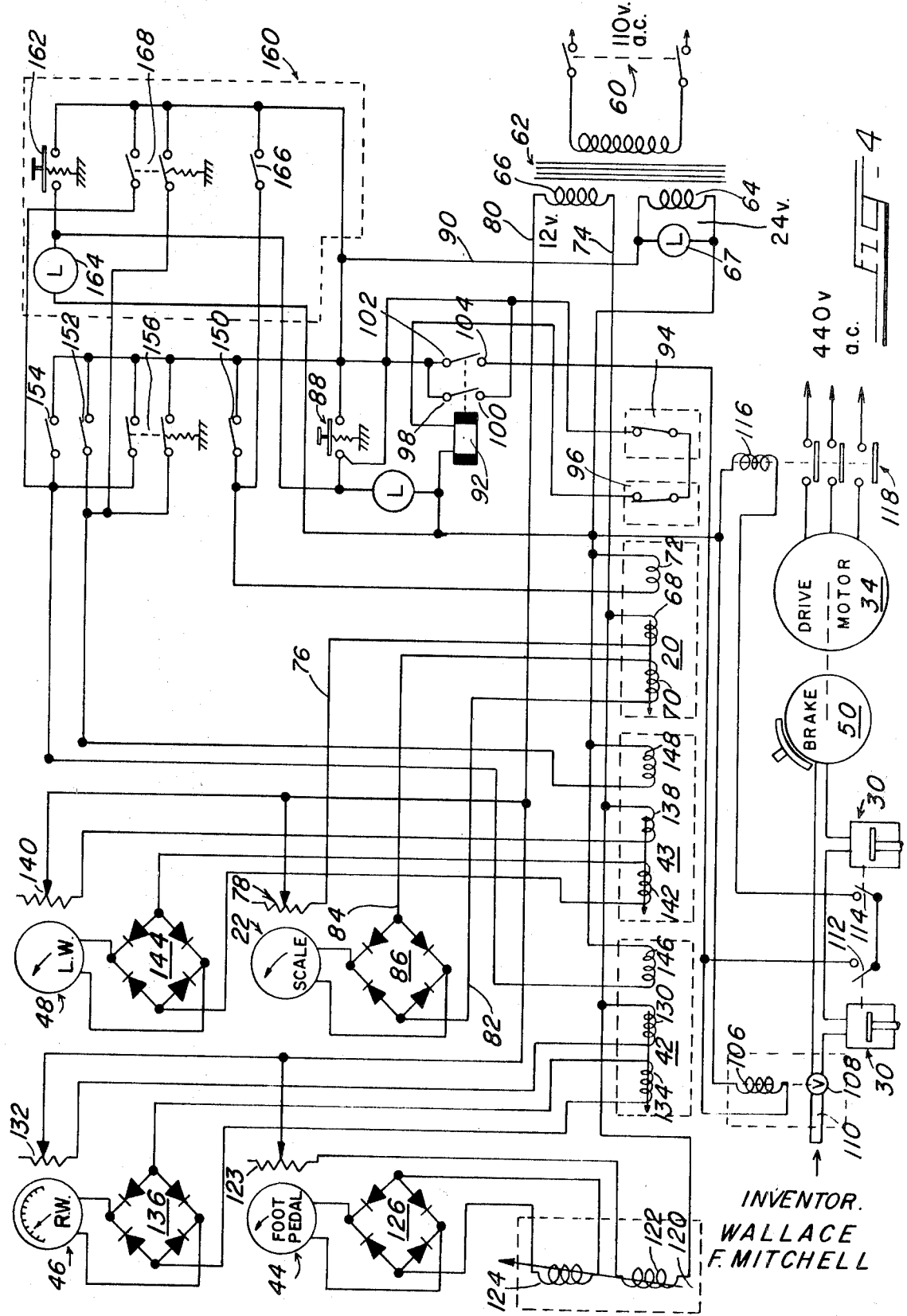

BRAKE TESTER

BACKGROUND OF THE INVENTION

The present invention relates to a method and apparatus for testing the wheel brakes of automotive vehicles and it relates more particularly to a new and improved brake tester for easily and accurately determining braking efficiency under standard predetermined conditions closely simulating those actually encountered on the road.

Automobile brakes, whether they be of the disk type or the drum and shoe type, exert a retarding force on the rotating wheels in response to the application of force to the brake pedal or other brake actuator. The force which actually stops the vehicle, however, is the force which is developed by the friction between the wheel and the road surface on which the vehicle is traveling. Accordingly, the effectiveness of the brakes to stop the vehicle depends on several factors including the coefficient of friction between the road surface and the tires and the weight of the vehicle on the tires. Obviously, the decelerating effect of the brakes varies with road conditions and any test which is conducted on the road is necessarily subjective and not amenable to the establishment of effective standards. Accordingly, road testing of automobile brakes is not a satisfactory method of determining the braking efficiency of the vehicle.

Another important factor which must be considered in determining if the brakes of a vehicle are satisfactory to decelerate the vehicle under normal driving conditions and to quickly stop the vehicle in an emergency is the force which must be applied by the operator to the brake pedal. Should this required force be relatively great, the brake system might be safe for use by a strong operator but unsafe for use by a weak operator. Any brake tester which does not take into account the force or pressure which must be applied to the brake pedal is, therefore, inherently unsatisfactory to indicate whether the brakes of the vehicle are actually safe.

SUMMARY OF THE INVENTION

It is, therefore, an object of the present invention to provide a new and improved apparatus and method for testing the brakes of automotive vehicles and the like.

Another object of the present invention is to provide a new and improved brake tester which permits the accurate testing of brakes under predetermined standardized conditions.

Another object of the present invention is to provide a new and improved brake tester which may be easily and quickly operated to test the brakes of automotive vehicles.

A further object of the present invention is to provide a brake-testing apparatus which may be used to diagnose the brake system of an automotive vehicle.

A still further object of the present invention is to provide a semiautomatic brake-testing apparatus which provides a visual indication of the efficiency of operation of the brakes being tested so as to permit individuals other than the person making the test to observe whether the brakes are safe and meet local standards.

Briefly, the above and further objects may be realized in accordance with the present invention by providing a brake tester which includes a scale for weighing the front and rear ends respectively of the vehicle to indicate the weight normally supported on each wheel of the vehicle, a pair of drive rollers having tire-engaging surfaces simulating normal road conditions for driving the wheels of the vehicle and means for determining the torque which must be applied to the drive rollers in order to rotate them against the braking force applied to the wheels by the brake system of the vehicle. In addition, there is provided means for measuring and displaying the force applied by an operator to the brake pedal and means are provided for sensing and displaying the weight of the vehicle on the wheels, and the torque applied through the drive rolls to the respective wheels. The display devices are so graduated that the efficiency of the brakes for each wheel of the vehicle can be read directly therefrom and, in addition, the display devices indicate whether the pedal pressure which must be applied to stop the vehicle within safe distances is not excessive.

BRIEF DESCRIPTION OF THE DRAWINGS

Further objects and advantages and a better understanding of the present invention may be had by reference to the following detailed description taken in connection with the accompanying drawings, wherein:

FIG. 4 is a schematic circuit diagram of the brake tester of the present invention.

DESCRIPTION OF THE PREFERRED EMBODIMENTS

Figure 1:
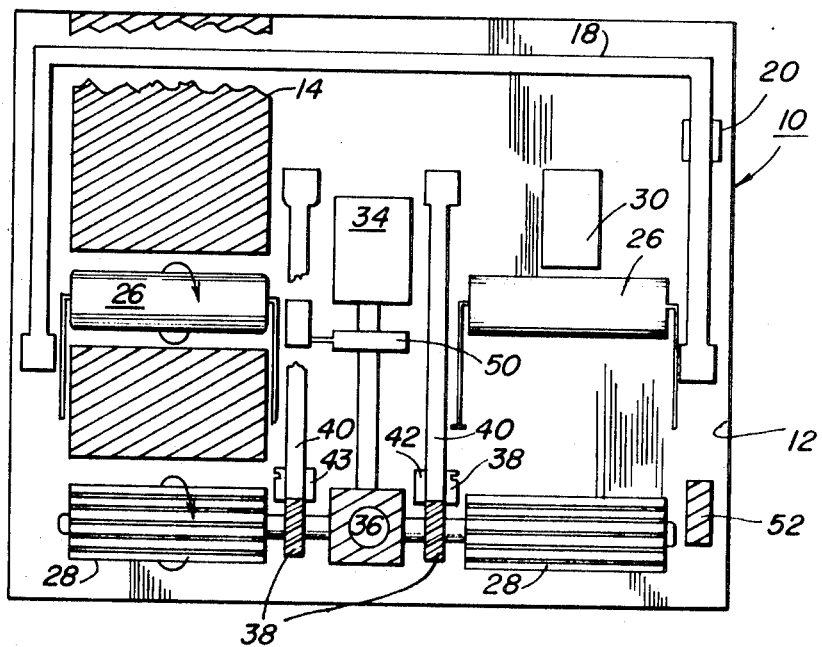
FIG. 1 is a plan view of a portion of a brake tester embodying the present invention, certain portions being removed to show the lower parts.

Referring now to the drawings, and particularly to FIG. 1, thereof, there is shown a portion of a brake tester 10 located in a pit or well 12 in a floor such that a scale platform 14 and a fixed wheel support 16 are flush with the floor. The platforms 14 and 16 are associated with the left side of the vehicle, and a similar scale platform and fixed platform (not shown) are located on the right side as viewed in FIG. 1.

Figure 2:
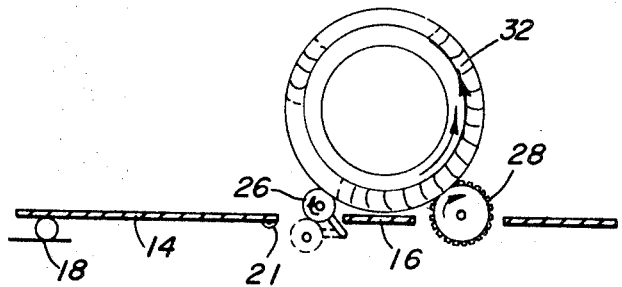
FIG. 2 is a vertical elevation showing the brake tester of FIG. 1 in operation.
Figure 3:
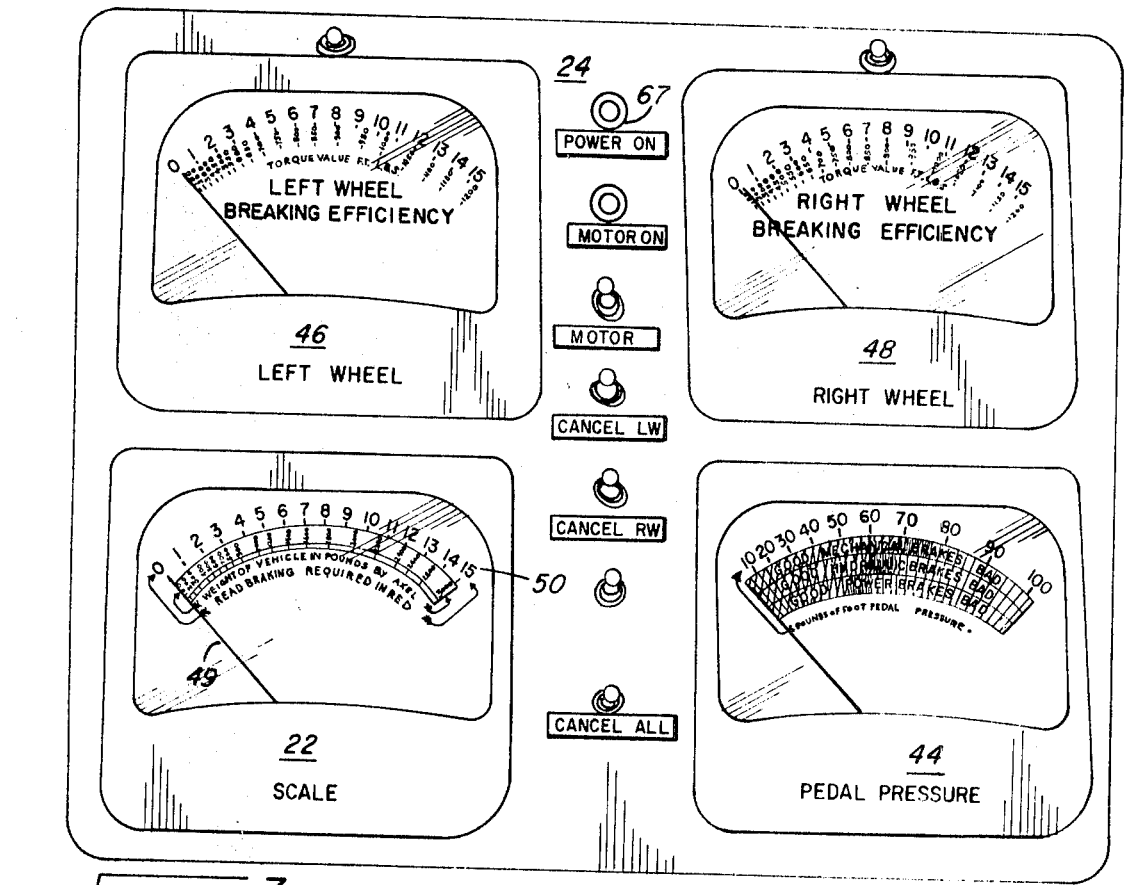
FIG. 3 is an illustration of the display and control panel of a brake tester embodying the present invention.

The brake tester 10 is adapted to test two wheels of a vehicle at a time, first the front wheels and then the rear wheels. As the vehicle is driven onto the apparatus, from top to bottom as viewed in FIG. 1, the front wheels first pass over the weighing platforms 14 and exert a force on a generally U-shaped torsion bar 18. The bar 18 is thus deflected to an extent indicative of the weight of the vehicle on the two front wheels. This deflection is sensed by a sensing and sender device 20 which produces an electric signal having an amplitude proportional to the weight of the vehicle on the two scale platforms 14. As best shown in FIG. 2, the platforms 14 are pivoted at the forward ends 21 thereof and rest on the torque bar 18 near the rearward ends thereof. The system is calibrated so that as the vehicle is driven across the platforms 14 the maximum signal generated by the sender 20 is proportioned to the weight of the vehicle on the front wheels and the sender 20 is shown by a display device 22 on a control panel 24, FIG. 3. As is more fully described hereinafter, the sender 20 continues to send to the meter 22 the maximum signal until it is cancelled or reset. Accordingly, the meter 22 will show the weight of the vehicle on the two wheels which are driven across the platform 14 after such wheels are no longer on the platforms 14.

After leaving the platforms 14, the wheels pass over a pair of idler rollers 26 which, at this time, are within the pit 12 such that their upper surfaces are approximately flush with the platforms 14 and 16. The vehicle is driven beyond the idler rollers 26 until it rests on the fixed platforms 16 with the wheels in engagement with respective ones of a pair of drive rolls 28. One of these drive rollers drives the right wheel and the other the left wheel of the vehicle. With the vehicle in this position, the motor start switch for the system is actuated which causes a pair of pneumatic jacks 30 to elevate the idler rollers 26 against the respective wheels of the vehicle to actually lift the wheels off the platform 16 onto the drive rolls 28. The maximum height of the idler rollers is adjustable so that the same footprints of the tires on the drive rollers may be obtained for different sizes of wheels. This condition of the system is best shown in FIG. 2 wherein one of the wheels 32 of the vehicle is supported between one of the idler rollers 26 and the associated drive roller 28. When the idler roller 26 has reached its maximum upper position, as shown in FIG. 2, a constant-speed drive motor 34 is energized to drive the rollers 28 through a gearbox 36 and a pair of planetary gear torque converters 38 at a constant angular velocity. The torque converters 38 are conventional whereby the housings may be held to provide the reaction force necessary to permit rotation of the drive rollers 28 in response to rotation of the output shafts from the gearbox 36. The reaction forces on the torque converter housings are provided by a pair of torsion arms 40 which are respectively secured against movement at their upper ends. A pair of sensing and sender devices 42 and 43, which are identical to the device 20, are provided for producing electric signals indicative of the amount of deflection of the housings of the torque converters 38 and therefore indicative of the torques applied to the respective drive rollers 28. With the wheels being tested supported by the idler rollers 26 and the drive rollers 28, the latter being driven at a fixed predetermined speed, the brake pedal of the vehicle is actuated by the operator through a sensing and sender device which produces an electric signal indicative of the force supplied to the pedal. The amplitude of this signal is shown on the meter 44 on the control panel 24. The torques which are thus applied to the drive rollers 28 and which are sensed by the sensor units 42 and 43 are converted into electric signals and respectively coupled to a pair of meters 46 and 48 on the control panel 24. These meters respectively indicate the torque applied to the drive rollers by the left wheel and the right wheel of the vehicle when the brakes are applied.

Considering the use of the brake tester of the present invention in greater detail, the needle 49 on the meter 22 indicates the weight of the vehicle on each axle and, in addition, indicates a guide number along the upper scale 50. A similar set of guide numbers is provided on each of the dials of the meters 46 and 48. When pedal pressure is applied to actuate the brakes of the vehicle, the needles of the meters 46 and 48 should register a torque which is no less than that required to stop the vehicle within safe limits and within the requirements of the local laws and therefore the pointer should point to a guide number no less than that to which the needle 49 of the meter 22 points. Moreover, the pointer on the meter 44 which indicates the actual force being applied to the brake pedal should fall within the area marked "GOOD" for each of the different types of brakes which the vehicle might have. For example, with power brakes, no more than 50 pounds should be required in order to completely stop the wheels. Somewhat greater forces are normally required with hydraulic and mechanical brakes. Should a greater force be required than that shown to be in a safe region on the meter 44, then it is apparent that the brakes are not safe since the operator of the vehicle might not be able to apply sufficient force to the brake pedal to stop the car even though the brakes would be capable of stopping the car if sufficient force were applied to the brake pedal. On the other hand, it may be that because of the condition of the tread on the tires of the vehicle, that even when the wheels are completely stopped from rotating by the brakes an insufficient retarding force is developed between the tires and the drive rollers 28 to stop the car within a safe distance. Since the meters 46 and 48 indicate the torque which is being applied through the drive rollers 28 to the respective wheels, this condition is indicated by the pointers on these meters reading a value less than the guide number to which the pointer 49 of the meter 22 reads.

The brake tester of the present invention can thus be used to determine the force required to actually stop rotation of the wheels. This is normally called a "panic" stop. When the system is used to determine the effectiveness of the brakes under emergency or panic stop conditions, the wheels of the vehicle are, of course, actually stopped, which condition is sensed by the idler rollers 26 coming to a stop. When this occurs, the entire system apparatus is shut down to prevent damage to the treads of the tire and to the surface of the drive rollers 28. This is accomplished in two ways. The pneumatic cylinders 30 are rapidly evacuated to drop the idler rollers 26 and a hydraulic brake 50 on the drive shaft from the motor 34 is actuated simultaneously with deenergization of the motor 34. The brake 50 thus quickly stops the drive rollers 28. This is normally the completion of the test and the vehicle is then driven forward to perform a similar test on the rear wheels.

In order to simulate the actual road conditions encountered by the vehicle, the brake tester 10 includes a control means 52 for setting the maximum position to which the idler roller 26 is elevated to lift the wheel 32 of the vehicle onto the drive rollers 28. It will be apparent to those skilled in the art that the actual footprint of the tires 32 on the drive roller 28 will depend on the circumference or size of the tire 32. Accordingly, the higher the wheel 32 is lifted by the roller 26 onto the drive roller 28, the greater will be the effective frictional force applied between the tire 32 and the drive roller 28. In a reduction to practice of the present invention, three predetermined positions of the roller 26 can be set by the pedal adjuster 52 and it has been found that this is an adequate number of positions for testing the automobiles now on the road.

Referring now to FIG. 4, the tester is energized from a suitable source of 110 volts AC by closing a double-pole, double-throw switch 60 which energizes the primary winding of a power transformer 62 having a first secondary winding 64 across which is generated approximately 24 volts and a second secondary winding 66 across which is generated approximately 12 volts. A pilot lamp 67 is connected across the winding 64 and is located at the top center of the control panel 24 to indicate that the system has been energized. At this time it may be seen that the sensor and sender unit 20 is energized. More particularly, and as more fully described hereinafter, the sender unit 20 includes a pair of windings 68 and 70 which are inductively coupled by a movable core which is moved in response to deflection of the torque bar 18. The construction of the sender 20 is such that after the bar 18 moves the core, it remains in its position of greatest coupling between the windings 68 and 70 until reset by a solenoid winding 72. The winding 68 of the sender 20 is the primary winding and is connected via a conductor 74 to one end of the secondary winding 66 and via a conductor 76, a variable resistor 78 and a conductor 80 to the other side of the winding 66. Accordingly, the position of the wiper on the adjustable resistor 78 determines the amplitude of current through the winding 68.

The secondary winding 70 is connected via a pair of conductors 82 and 84 to a full-wave rectifier bridge circuit 86, the output of which is connected to the meter 22. Hence, the adjustable resistor 78 may be used to zero the meter 22, and as the core which couples the primary and secondary windings 68 and 70, respectively, is moved by the torque bar 18, the coupling between these windings is increased and the pointer on the meter 22 thus indicates the weight of the vehicle. Since the core of the sender 20 does not return to its zero position after the wheels have passed over the weighing platform 14, the pointer on the meter 22 continues to remain in its maximum reading position after the wheels pass off the platform 14.

After the operator has thus driven the wheels across the weighing platform 14 and onto the intermediate platform 16 between the drive rollers 28 and the idler rollers 26, he may continue the brake test by depressing a start button 88 which is connected via a conductor 90 to the upper end of the primary winding 64.

With the start button 88 depressed, the solenoid of a relay 92 is energized through the series connection of a pair of normally closed switches 94 and 96. A pair of holding contacts 98 and 100 on the solenoid are provided so that when the relay 92 picks up it is held in until either or both of the switches 94 and 96 open. The motor start switch 88 is spring loaded in an open position and need be closed only momentarily in order to pick up the relay 92 to close the armature on the holding contacts 98 and 100 to maintain the motor circuit energized.

The relay 92 has a second set of contacts 102 and 104 which, with the relay 92 picked up, connect the solenoid 106 of a control valve 108 across the secondary winding 24 thereby to energize the solenoid 106 and open the valve 108.

The valve 108 is connected in an air line 110 which is connected to a source of pressurized air at a pressure of about 25 p.s.i. and when open operates the pistons in the jacks 30 to lift the idler rollers 26 to their operative positions. In addition, when the valve 108 opens, the pressurized air is connected to the brake 50 thereby to release it. When the pressure within the cylinders of the jacks 30 builds up to a value approximating that of the pressure in the line 110 a pair of pressure-operated switches 112 and 114 are closed. Hence, the switches 112 and 114 close when the idler rolls are moved to their operative positions whereby the tires of the vehicle being tested are in the proper position on the drive rollers 28. The switches 112 and 114 are connected in series between the solenoid 116 of a power relay 118 and the contact 104 of the relay 92. Consequently, when the switches 112 and 114 are both closed, the solenoid 116 is energized to close the contactors on the relay 118 thereby to couple three-phase 440 volts AC to the drive motor 34. Since the brake 50 is released at this time the drive motor drives the drive rollers 28.

With the drive motor 34 energized and the wheels of the vehicle thus being driven at a predetermined rate of speed by the drive rollers 28, the operator may apply pedal pressure to the brake of the vehicle through a sender unit 120. The unit 120 includes a primary winding 122 having one terminal thereof connected to one side of the 12-volt secondary winding 66 of the main power transformer 62 and having its other terminal connected through a rheostat 123 to the conductor 80 which is in turn connected to the other side of the 12-volt secondary winding 66. The pedal pressure sender unit 120 also includes a secondary winding 124 which is coupled to the winding 122 and which is connected across a full-wave rectifier bridge 126, the output of which is connected to the meter 44. As the pressure applied to the brake pedal through the unit 120 is increased the coupling between the windings 122 and 124 is correspondingly increased whereby the meter 44 provides an indication of the force which is applied to the brake of the vehicle.

With the brakes applied to the wheels of the vehicle, which wheels are in frictional engagement with the drive rollers 28, a torque is developed on the differential housings 38 and a corresponding force is exerted on the sender units 42 and 43, respectively. The sender unit 42 which is associated with the right wheel of the vehicle includes a primary winding 130 which is connected via the conductor 74 to one side of the 12-volt secondary winding 66, and the other terminal thereof is connected through a rheostat 132 to the conductor 80 and thus to the other side of the 12-volt secondary winding 66. The sender unit 42 also includes a winding 134 which is mutually coupled to the primary winding 130 and is connected across the input of a full-wave rectifier bridge 136 whose output is connected to the meter 46. Similarly, the sender unit 43 which is associated with the left wheel of the vehicle has a primary winding 138 which is connected between one side of the secondary winding 66 and through a rheostat 140 to the other side of the 12-volt secondary winding 66. A secondary winding 142 which is mutually coupled to the primary winding 138 is connected across the input of a full-wave rectifier bridge 144 whose output is connected to the input terminals of the meter 48. As the forces exerted on the sender units 42 and 43 increase, the coupling between the primary and secondary windings thereof increases proportionally so that the meters 46 and 48 respectively provide an indication of the torque which is exerted on the drive rollers by the right and left wheels of the vehicle.

The sender units 20, 42 and 43 each include a mechanical clutch which maintains the movable core therein at the position of maximum coupling to which it is moved by the torque arms 40 and 18. Consequently, the meters 22, 46 and 48 respectively indicate the maximum forces exerted on the associated sender units. The scale meter 22, therefore, indicates the weight of the vehicle even after the vehicle has been driven off the weighing platforms 14. In like manner, the right-wheel meter 46 indicates the maximum braking effect of the right wheel during the test and the meter 48 indicates the maximum braking effect of the left-wheel brakes during the test.

In order to reset the meters 22, 46 and 48, each of the sender units 20, 42 and 43 includes a release solenoid. As described hereinbefore, the scale sender unit 20 includes the release solenoid 72. The sender unit 42 includes a release solenoid 146 and the sender unit 43 includes a release solenoid 148. When these solenoids are energized, the cores are released and move to their reset zero-coupling position whereby the pointers on the associated meters return to zero.

In order to energize the solenoid 72 in the scale sender unit 20, the solenoid 72 is connected between the lower side of the secondary winding 64 and the reset switch 150 on the control panel, the other contact of which switch is connected to the upper end of the 24-volt secondary winding 64. In like manner, the reset solenoid 148 in the sender unit 43 is connected between the lower terminal of the 24-volt secondary winding 64 and a cancel switch 152 on the control panel, the other contact of this switch being connected to the upper terminal of the 24-volt secondary winding 64. Similarly, the reset solenoid 146 is connected between the lower terminal of the secondary winding 64 and one contact of a reset switch 154 on the control panel, the other contact of which switch is connected to the upper terminal of the secondary winding 64.

Under some circumstances, it is desirable to maintain the reset solenoids 72, 146 and 148 energized during application of the vehicle brakes so that the individual making the test may observe the manner in which the brakes on the vehicle take effect. In this case, the operator should place the cancellation switches 152 and 154 in the closed position. Where, however, it is simply desired to reset the meters 46 and 48, the double-throw, double-pole switch 168 which is spring biased in an open position and which is connected in parallel with the switches 152 and 143 should be momentarily actuated.

In order to permit operation of this system from a remote location, there is provided a remote control box 160 which includes a motor start switch 162 connected in parallel through a cable with the motor start switch 88 on the control panel, a pilot light 164 connected in parallel with the pilot lamp on the control panel, a scale cancellation switch 166 connected in parallel with the scale cancellation switch 150 on the control panel and a double-throw, double-pole right- and left-wheel cancellation switch which is spring biased in a normally open position and which is connected in parallel with the switch 156. Consequently, the test may be conducted from a remote location as, for example, where the operator is alone and must himself operate the foot pedal of the vehicle during the test.

When the pressure exerted on the foot pedal sender unit 120 is sufficient to lock either of the wheels being tested, rotation of the associated one of the idler rollers 26 will, of course, stop, and as a result the associated one of the switches 94 and 96 will open momentarily thereby deenergizing the main solenoid 92 so that it opens thereby to deenergize the motor and drop out the solenoid 106 to close the valve 108 whereby pressure in the cylinders of the jacks 30 is reduced causing the switches 112 and 114 to open and, in addition, the pressure to the brake 50 is released whereby the brake takes effect to rapidly stop rotation of the drive rollers 28 before the vehicle can be carried by the drive rollers 28 off the test stand. As the jacks 30 are released, the idler rollers 26 drop and the wheels under test move back onto the platform 16. With the system shut down, the operator can now observe the readings on the scale 22, 46 and 48 to determine if the brakes meet the required standards. The reset switches 150 and 156 can now be momentarily closed to reset the scales 22, 46 and 48 to zero, and the vehicle may now be moved forwardly to pass the rear wheels over the scale platform so that the scale meter 22 will now indicate the weight of the rear wheels. With the rear wheels on the platform 16, the brake test is repeated by closing the motor start switch 88 and applying brake pressure to the brake pedal of the vehicle through the sender unit 120.

The meters are then read in the same manner as described hereinbefore to determine if the rear-wheel brakes operate in a satisfactory manner.

Figure 5:
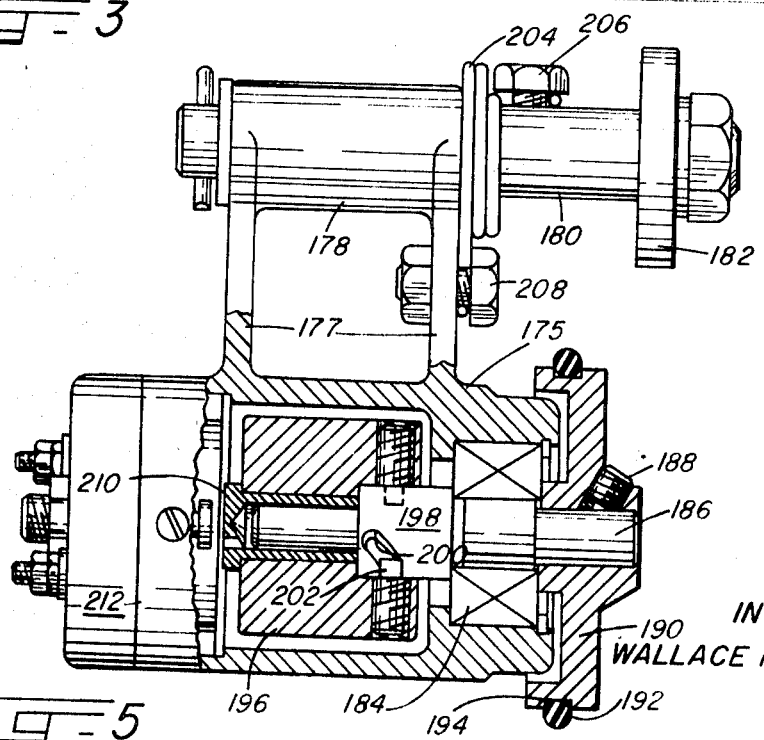
FIG. 5 is a partially sectioned view of a switch and actuator assembly suitable for use in the brake tester of the present invention.

Referring now to FIG. 5 there is shown a switch and actuator assembly which is adapted to be driven by an idler roller 26. This assembly includes a cylindrical housing 175 connected by a pair of integral arms 177 to an integral, tubular bushing portion 178. The bushing 178 is pivotally mounted over a pivot bar 180 which is fixedly connected to a mounting plate 182.

A bearing 184 is mounted in a counterbore at one end of the housing 175 and receives a shaft 186 to the end of which is fixedly secured, by means of a setscrew 188, a capstan wheel 190. A resilient O-ring 192 is stretched over the rim of the wheel 190 and seats in an annular groove 194 whereby the ring 192 may ride against the roller 26 or the shaft thereof. A flywheel 196 is loosely disposed over the inner end of the shaft 186 within the housing so as to be axially and rotatably movable with respect thereto. The shaft 186 has a large-diameter central section 198 provided with a pair of helical grooves 200 in which ride a pair of follower pins 202 threadedly held in the flywheel 196.

A coil spring 204 is positioned over the pivot bar 180 and one end of the spring is fastened to the bar 180 by a bolt 206. The other end of the spring 204 is fastened to one of the arms 177 by a bolt 208. The spring 204 thus applies a torque to the housing 175 to resiliently bias the capstan wheel against the idler roller whereby the flywheel is rotated when the idler roller rotates. The wheel 190 is adapted to be driven by the associated idler roller in a clockwise direction as viewed from the right-hand side of FIG. 5. Hence, when the idler roller abruptly stops, which event occurs at the moment the wheel under test begins to slip on the drive roller, the flywheel 196 moves axially to the left as viewed in FIG. 5. As a consequence, a switch-actuating button 210 which is fitted in the end of the flywheel 196 closes a set of switch contacts (not shown) in the contact assembly 212, which contacts correspond to the contacts 94 or 96 in FIG. 4.

While the present invention has been described in connection with particular embodiments thereof, it will be understood that many changes and modifications of this invention may be made by those skilled in the art without departing from the true spirit and scope thereof. Accordingly, the appended claims are intended to cover all such changes and modifications as fall within the true spirit and scope of the present invention.

I claim:

1. Apparatus adapted for testing the brakes of an automotive vehicle, comprising
    drive roller means having a road-simulating, tire-engaging surface thereon,
    idler roller means for holding at least one tire of said vehicle on said drive roller,
    motor means for rotating said drive roller means at a constant speed to rotate a tire supported thereon,
    means for indicating the torque applied to said drive roller means,
    means for indicating the force applied to the brake actuator of said vehicle, and
    means for deenergizing said motor means when said tire skids on said drive roller means.

2. Apparatus as set forth in claim 1 wherein said means for deenergizing said motor means comprises
    means responsive to a rapid deceleration of said idler roller means.

3. Apparatus as set forth in claim 2 further comprising braking means for stopping the rotation of said drive roller means in response to a rapid deceleration of said idler roller means.

4. Apparatus as set forth in claim 1 wherein the height of said idler roller means is adjustable to vary the footprint of said tire on said drive roller means.

5. Apparatus as set forth in claim 1 further comprising means defining a pathway along which the vehicle under test is adapted to be driven,
    scale means disposed along said pathway indicating the weight of the vehicle respectively supported by the front and rear wheels thereof,
    said drive roller means comprises a plurality of drive rollers positioned along said pathway, and
    said idler roller means comprises a plurality of idler rollers.

6. Apparatus as set forth in claim 5 further comprising hydraulic means for elevating said idler rollers to adjustable predetermined positions to lift the tires of said vehicle onto said drive rollers.

7. Apparatus as set forth in claim 5 further comprising means for causing said scale means to record the maximum weight on the front and rear wheels of the vehicle as it passes over said scale means.

8. A method of testing the brakes for the wheels of an automotive vehicle, comprising the steps of
    passing one pair of wheels of the vehicle over a scale to determine the actual weight of the vehicle on said pair of wheels and the braking torque required on said pair of wheels to safely brake said vehicle,
    displaying on a display panel the value of said braking torque required to safely brake said vehicle,
    supporting said wheels on a pair of drive rollers,
    rotating said drive rollers through a torque-measuring device at a constant speed,
    applying a force to the brake actuator of the vehicle to actuate said brakes while
    simultaneously measuring and displaying on said panel the torque applied to said drive rollers and the force applied to said brake actuator,
    comparing the value of said applied torque to the displayed value of torque required to safely brake said vehicle, and
    displaying on said panel the force applied to said brake actuator to effect said applied torque.